(12) United States Patent
Grieve et al.

(10) Patent No.: US 8,034,499 B2
(45) Date of Patent: Oct. 11, 2011

(54) ENERGY CONVERSION DEVICE INCLUDING A SOLID OXIDE FUEL CELL FUELED BY AMMONIA

(75) Inventors: Malcolm James Grieve, Fairport, NY (US); Galen B. Fisher, Bloomfield Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 1223 days.

(21) Appl. No.: 11/784,125

(22) Filed: Apr. 5, 2007

(65) Prior Publication Data

US 2008/0248353 A1     Oct. 9, 2008

(51) Int. Cl.
H01M 8/04 (2006.01)
(52) U.S. Cl. .................................. 429/434; 429/440
(58) Field of Classification Search .................. 429/423
See application file for complete search history.

(56) References Cited

U.S. PATENT DOCUMENTS

| | | | |
|---|---|---|---|
| 5,071,719 A * | 12/1991 | Rostrup-Nielsen et al. | 429/415 |
| 2004/0048132 A1 * | 3/2004 | Takai et al. | 429/34 |
| 2004/0175315 A1 * | 9/2004 | Brisley et al. | 423/239.1 |
| 2006/0251940 A1 * | 11/2006 | Bandhauer et al. | 429/26 |
| 2007/0037025 A1 | 2/2007 | Venkataraman et al. | |
| 2007/0207351 A1 * | 9/2007 | Christensen et al. | 429/17 |

FOREIGN PATENT DOCUMENTS

| | | | |
|---|---|---|---|
| JP | 2003-040602 | * | 7/2001 |
| JP | 2004-247268 | * | 2/2003 |
| WO | 2005/091418 | | 9/2005 |
| WO | WO 2005091418 | * | 9/2005 |
| WO | 2006/081824 | | 8/2006 |
| WO | 2007000170 | | 1/2007 |

OTHER PUBLICATIONS

European Search Report dated Jul. 4, 2008.
Dekker N J J et al: "Highly efficient conversion of ammonia in electricity by solid oxide fuel cells" 6$^{th}$ European Solid Oxide Fuel Cell Forum, , Jan. 1, 2004, pp. 1524-1534, XP009102269 p. 1524, paragraphs 2, 4 p. 1531, paragraph 2 p. 1529, paragraph 3 abstract.
Christensen et al: "Towards an ammonia-mediated hydrogen economy?" Jan. 15, 2006, Catalysis Today, Elsevier, pp. 140-144, XP005221541 ISSN: 0920-5861 the whole document.
Faghri A et al: "Challenges and opportunities of thermal management issues related to fuel cell technology and modeling" Sep. 1, 2005, International Journal of Heat and Mass Transfer, Pergamon Press, GB, pp. 3891-3920, XP004984759 ISSN: 00179310 the whole document.
EP Search Report dated Nov. 19, 2008.

* cited by examiner

*Primary Examiner* — Ula C Ruddock
*Assistant Examiner* — Jacob Marks
(74) *Attorney, Agent, or Firm* — Thomas N. Twomey

(57) ABSTRACT

An energy conversion system comprising ammonia for fueling an SOFC stack to generate electricity and a hydrogen-rich tailgas. In the SOFC stack, ammonia is cracked to hydrogen and nitrogen. Ammonia is stored in a metal halide complex and is released therefrom as gaseous ammonia by waste heat from the SOFC. A heat exchanger is positioned across the SOFC cathode such that incoming air is tempered by the cathode exhaust air. In a two-stage energy conversion system, the hydrogen-rich tailgas from the SOFC is supplied as fuel to a secondary energy conversion device which may be, for example, an internal combustion engine or a gas turbine engine which may operate, for example, either a generator for generating additional electricity or a vehicle for motive power, or a second fuel cell stack.

16 Claims, 3 Drawing Sheets

US 8,034,499 B2

ENERGY CONVERSION DEVICE INCLUDING A SOLID OXIDE FUEL CELL FUELED BY AMMONIA

TECHNICAL FIELD

The present invention relates to fuel cell systems for producing electric power and heat; more particularly, to hybrid systems wherein the tail gas from a first fuel cell is used to power a secondary energy conversion system such as a second fuel cell or an internal combustion engine (ICE); and most particularly, to such hybrid systems wherein part or all of the hydrogen fuel for powering the first fuel cell is derived from decomposition of ammonia.

BACKGROUND OF THE INVENTION

Solid oxide fuel cells (SOFCs) are well known in the fuel cell art. SOFCs have significant advantages over some other forms of fuel cells, such as proton exchange membrane (PEM) fuel cells, in that SOFCs are not subject to CO poisoning of the anode and therefore can burn reformate directly from a catalytic hydrocarbon reformer, which produces CO and $H_2$. Further, some simple fuels such as natural gas (methane) and short-chain alcohols (methanol, ethanol, etc.) can be partly or fully reformed internally in the SOFC anode, conferring large advantages in efficiency and simplification of an overall fuel cell system.

It is known in the fuel cell art to employ ammonia ($NH_3$) as another cost-effective alternative fuel, which is well-matched to internal reforming. Ammonia may be fed directly into an SOFC anode and cracked to nitrogen and hydrogen in an endothermic reaction without requiring a separate catalytic fuel reformer as is needed for fueling of an SOFC with conventional, petroleum-based fuels.

A very great advantage of ammonia compared to carbon-based fuels is that coking of the anode is not possible, because there is no carbon in the fuel. This allows a wider window of operating temperature in the anode, which can make possible operation of an SOFC at lower operating temperatures, thereby permitting the use of lower cost materials for forming the SOFC stack.

Another advantage is that manufactured ammonia is essentially sulfur-free, which avoids the well-known deterioration of an anode that can occur with even trace quantities of sulfur, as are typically present in naturally-occurring hydrocarbon fuels such as gasoline. This feature also avoids the necessity of incorporating into an SOFC system sulfur-trapping means and/or expensive sulfur-tolerant materials of manufacture.

Another advantage of fueling by ammonia is that it is a zero $CO_2$-emissions fuel. Although commercial synthesis of ammonia typically involves the use of hydrocarbon fuels, such synthesis may be performed at the hydrocarbon wellhead with the resulting $CO_2$ sequestered underground. Alternatively, ammonia may be synthesized using nuclear energy which, of course, does not generate $CO_2$.

A solid tablet invented by a Amminex A/S comprising ammonia absorbed efficiently in compact salt units is safe to handle and consist of inexpensive and abundant raw materials. This makes it different from most other hydrogen storage technologies in that it requires no special safety precautions. Ammonia has a high hydrogen content and when stored safely in a solid form enables the material to contain large amounts of hydrogen per unit volume, making it an ideal "hydrogen carrier" fuel for vehicular and stationary power systems.

It is known to combine an SOFC stack, operated with hydrocarbon reformate as a fuel source, with an internal combustion engine (ICE) in a two-stage energy conversion system wherein the anode tailgas of the SOFC, containing large amounts of hydrogen and CO, is used as a hot fuel for the downstream ICE.

What is needed in the art is an analogous system fueled by ammonia as a source for hydrogen fuel.

It is a principal object of the present invention to provide an efficient, zero-$CO_2$-emissions, system for generating electrical, and optionally mechanical and thermal, energy.

SUMMARY OF THE INVENTION

Briefly described, in an energy conversion system, ammonia is used for fueling a solid oxide fuel cell stack to generate electricity and a hydrogen-rich tailgas for fueling a second energy conversion device such as another fuel cell, an internal combustion engine, or a gas turbine engine. Ammonia is preferably stored in a metal ion complex and is released therefrom by waste heat from the SOFC. Ammonia is cracked endothermically in the SOFC anode to yield hydrogen and nitrogen. Part of the hydrogen is consumed in the anode (to form water) in the normal operation of the SOFC. In a two-stage energy conversion system, additional ammonia is cracked in the SOFC, such that the anode tailgas from the SOFC remains rich in hydrogen. Part of this hydrogen-rich anode tailgas may then be supplied as fuel to a secondary energy conversion system which may be, for example, an ICE which may operate, for example, either a generator for generating additional electricity or a vehicle for motive power, a PEM or alkaline fuel cell, or a gas turbine engine.

BRIEF DESCRIPTION OF THE DRAWINGS

The present invention will now be described, by way of example, with reference to the accompanying drawings, in which.

The exemplifications set out herein illustrate three currently-preferred embodiments of the invention, and such exemplifications are not to be construed as limiting the scope of the invention in any manner.

DESCRIPTION OF THE PREFERRED EMBODIMENTS

Figure 1:
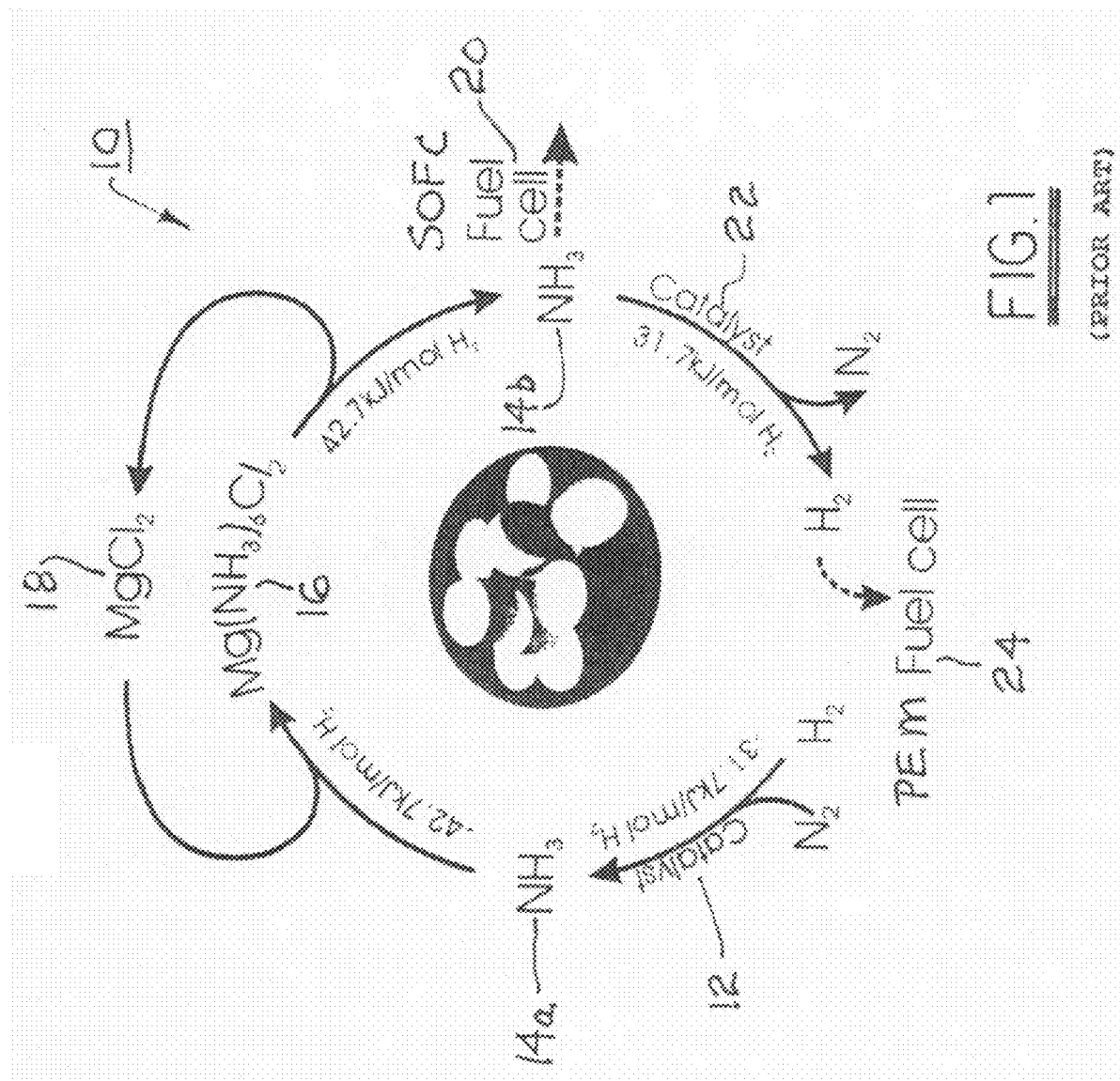
FIG. 1 is a prior art schematic drawing of the hydrogen pathway in a cycle for forming ammonia and for using ammonia as a hydrogen-generating fuel for either an SOFC or a PEM fuel cell.

Referring to FIG. 1, a known prior art cycle 10 for the storage and utilization of hydrogen via an ammonia intermediate is shown. Hydrogen and nitrogen are catalytically combined 12 to form ammonia 14a which is then reversibly stored as a solid state storage complex 16 comprising six ammonia molecules in a lattice of magnesium chloride. (Other ammonia-complexing materials are known, such as other salts of Group II metals and Groups VII halides, any of which may be used for ammonia storage within the scope of the present invention; $MgCl_2$ as used herein represents generically all such materials.) The rights to this process are owned by a Danish company, Amminex A/S, from which tablet-shaped blanks of the material are available. Storage complex 16 meets DOE goals for vehicular hydrogen storage and is stable, non-toxic, and non-explosive. The mass density of ammonia is about 50%, and the volumetric density is similar to that of liquid ammonia. Four of the six ammonia molecules 14b are removable by heating the material to 200° C., and all six may be removed by heating the material to 350° C. (with temperature and number of molecules released depending upon which complexing materials are used) and the stripped storage matrix 18 may be recharged with fresh ammonia 14a.

In accordance with the invention, ammonia 14b may be utilized directly as a fuel in the anode of an SOFC 20 or may be decomposed 22 via an appropriate known catalyst to yield nitrogen and hydrogen—which may be utilized as a fuel in the anode of a PEM fuel cell 24. It will be seen, therefore, that an ammonia/salt complex provides a preferred and practical means for rechargeable storage of large quantities of ammonia/hydrogen on board a vehicle for use as a fuel on a vehicular or stationary fuel cell system. Of course, other forms of ammonia/hydrogen supply and storage, such as compressed, cryogenic, solution storage, and the like, are also fully comprehended by the invention.

Figure 2:
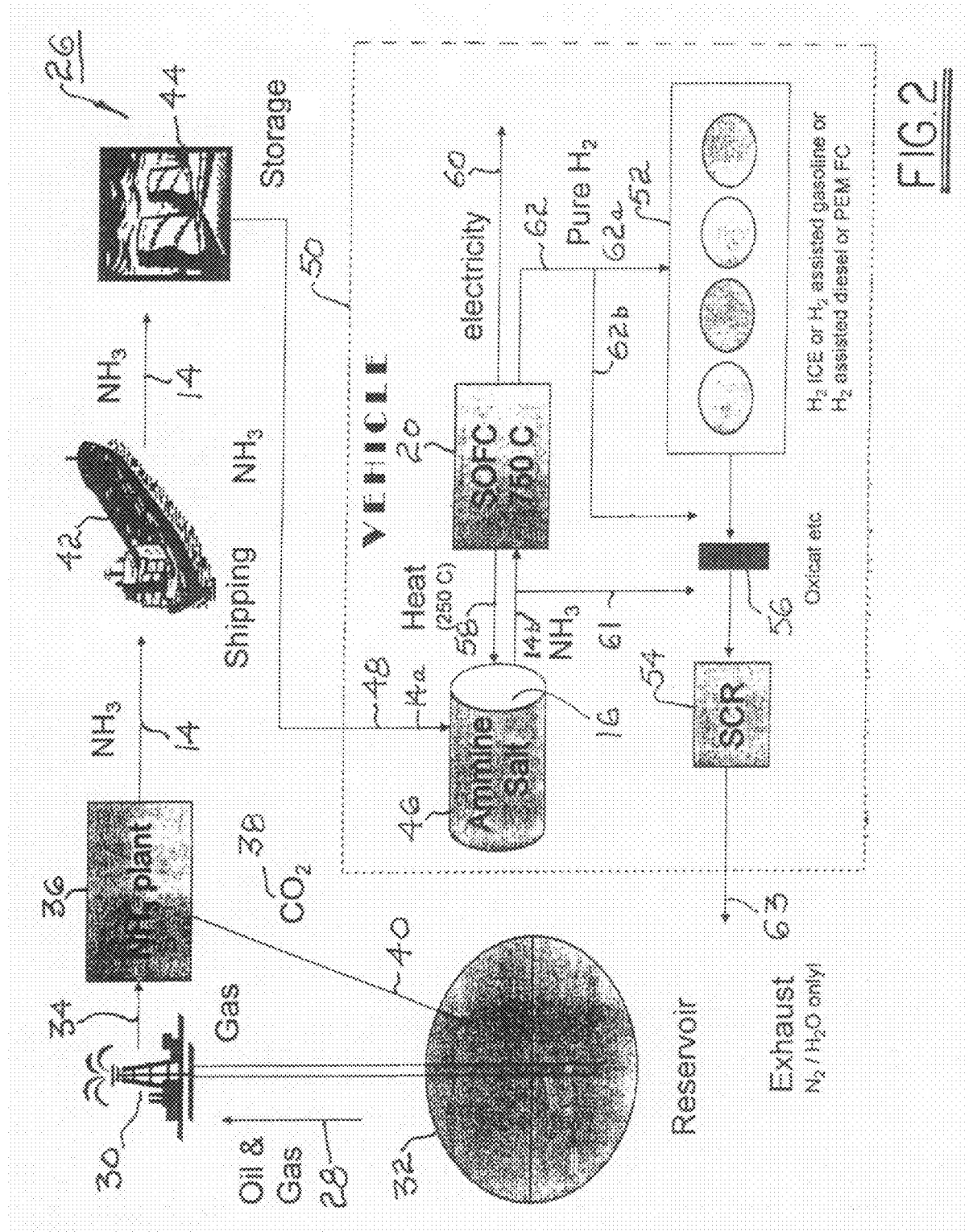
FIG. 2 is a schematic diagram showing formation, shipping, storage, and usage of ammonia in a $CO_2$-free two-stage energy conversion system in accordance with the present invention.

Referring to FIG. 2, an exemplary global process flow 26 is shown for a generic vehicular SOFC fueled by ammonia/hydrogen. Oil and gas 28 are produced conventionally at a well 30 from a subterranean reservoir 32. Gas 34 from well 30 fuels an ammonia generation plant 36 wherein hydrogen and nitrogen are combined to form ammonia 14. By providing plant 36 near well 30, the $CO_2$ effluent 38 may be conveniently and desirably sequestered 40 in reservoir 32 or other convenient subterranean reservoir or chemical treatment, rather than being released to the atmosphere. Ammonia 14, typically in liquid form, is transported 42 to an intermediate storage means 44 from whence a storage tank 46 containing storage matrix 18 may be charged 48 with ammonia to yield a charged tankful of storage complex 16.

In an exemplary vehicular application in accordance with the invention, storage tank 46 represents a fuel tank on board vehicle 50. Also on board vehicle 50 is an SOFC 20, a secondary energy conversion system 52 which may be a motive system for vehicle 50, and a selective catalytic reduction (SCR) catalyst 54 for treatment of NOx from system 52. (Note: secondary energy conversion system 52 may be, for example, an internal combustion engine (ICE), a PEM fuel cell system (PEM), or a gas turbine engine or generator (GT); all are anticipated by the invention, and the term "system" as used herein for convenience should be taken to mean any secondary energy conversion device.) Additionally, for some applications wherein system 52 is partially fueled by hydrocarbons (such as diesel, for example) in addition to hydrogen, an exhaust aftertreatment such as an oxidation catalyst, diesel particulate filter (DPF) 56 and optionally a NOx trap catalyst (not shown) is needed to meet low emission limits.

In operation, SOFC 20 operates optimally at an internal temperature of about 750° C., generating hot cathode exhaust 58, electricity 60, and anode tailgas stream 62 comprising nitrogen, steam and large amounts of unused hydrogen. Hot cathode exhaust 58 is used to heat ammonia complex 16 in storage tank 46 to a temperature wherein ammonia 14b is released from tank 46 and passed into SOFC 20 as fuel to the anode thereof. The ammonia stream 14b may be divided, and a portion 61 thereof passed through SCR 54 to convert NOx emissions from the system 52 back to nitrogen and oxygen. Anode tailgas 62 from SOFC 20, containing water and hydrogen, may be used to partially or fully fuel system 52. Exhaust from system 52 is passed through catalyst/filter 56 and SCR 54. Anode tailgas 62 may be divided into a first portion 62a, passed on as fuel, and a second portion 62b diverted as needed to regenerate catalyst/filter 56.

It will be seen that in this configuration, wherein an SOFC is linked to and provides fuel for a downstream energy-generating device, the SOFC functions primarily as a reformer or cracker for ammonia to provide clean hydrogen fuel, rather than as a substantial source of electricity. This concept of an SOFC is new in the fuel cell art.

Further, the fueling of an energy conversion system by ammonia-derived hydrogen permits the system to be used in a confined space such as a garage, warehouse or basement without regard to significant consideration for exhaust venting, as the exhaust 63 contains extremely low regulated emissions from either the SOFC (20) or secondary system (52)—essentially only nitrogen and water.

Note that in an application of process flow 26 wherein item 52 is a PEM fuel cell stack being supplied with SOFC tailgas 62, it is desirable to include a hydrogen purification apparatus (not shown) between the SOFC and the PEM to remove trace amounts of ammonia which can be harmful to the PEM anode.

Further purified hydrogen may be stored such that the system 52 may be operated asynchronously with the SOFC (20). Such storage may be in several forms known in the art, such as metal hydride, compressed, cryogenic, solution storage and the like. These storage options are also fully comprehended by the invention.

Figure 3:
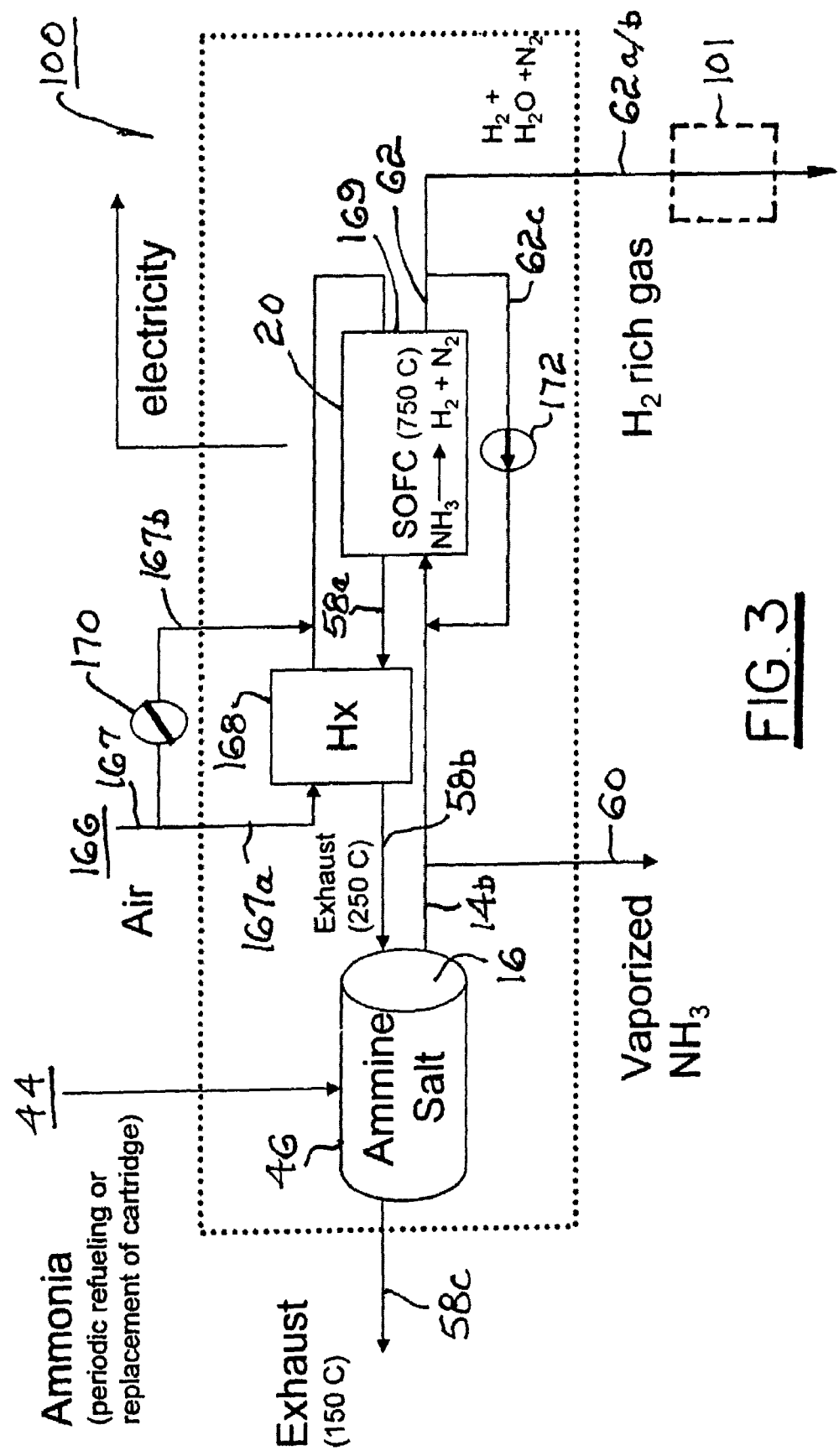
FIG. 3 is a schematic diagram of an ammonia-fueled distributed energy system employing an SOFC and secondary energy conversion device in accordance with the present invention.

Referring now to FIG. 3, a currently preferred embodiment 100 of an SOFC fueled by ammonia is described in more detail. It comprises storage tank 46 containing ammonia storage complex 16; an SOFC 20; an air supply 166; and an air heat exchanger 168 disposed across the cathode side of SOFC 20. Optionally, embodiment 100 may further include an air bypass valve 170 to regulate the volume of intake air flowing through heat exchanger 168 (and hence the temperature of air entering SOFC 20); and anode recycle pump 172 for recycling a third portion 62c of tailgas divided from tailgas 62 through SOFC 20.

In operation, storage complex 16 will have been charged with ammonia from an ammonia source 44. Intake air 167 from air supply 166 is passed through the cold side of heat exchanger 168 and thence through the cathode side of SOFC 20, entering preferably but not necessarily at the downstream process end 169 of SOFC in counterflow mode therethrough (counterflow referring to the direction of air flow's being counter to the direction of ammonia flow through the SOFC). Hot cathode exhaust 58a exiting SOFC 20 is passed through the hot side of heat exchanger 168 thereby heating intake air 167 and being cooled to a lower but still elevated temperature before being passed 58b through storage tank 46 to liberate ammonia 14b from storage complex 16. Part of this exhaust 58b may be bypassed (not shown) around the storage tank 46, in order to control the rate of ammonia evolution. Cooled exhaust 58c still has some heat remaining and may be used for low-temperature purposes such as heating water or for space heating (not shown).

It is important to note that the endotherm produced by cracking of ammonia in the SOFC serves to cool the temperature of the stack. Stack cooling by the endotherm substantially reduces the cathode air flow requirements to the extent that additional cathode air is no longer needed to cool the stack. This makes the system cheaper (smaller heat exchanger, blower, etc.) and more efficient (lower parasitics).

In a first preferred control variant of embodiment 100, intake air 167 is divided into a first portion 167a that is passed through heat exchanger 168 and a second portion 167b that is passed around heat exchanger 168 and through air bypass valve 170. Air flows 167a, 167b are combined before entry into SOFC 20. By regulating the flow of bypass air 167b, the entry temperature of air into SOFC 20 can be controlled, hence the entry temperature of cathode exhaust 58a into heat exchanger 168, hence the temperature of air entering storage tank 46, and hence the rate of stripping of ammonia from complex 16.

In a second preferred control variant of embodiment 100, a third portion 62c of tailgas 62 (recall a second portion 64b in FIG. 2) is recycled in known fashion through tailgas recycle control valve 172 into the anode inlet of SOFC 20 to increase the fuel efficiency of the SOFC and flatten the temperature profile in the stack.

Additionally, embodiment 100 may include a hydrogen storage reservoir 101 to allow SOFC 20 to continue to operate on standby when there is little or no present demand for hydrogen fueling of a secondary energy conversion device 52. The stored hydrogen then may be used upon restart or greater demand of device 52.

Embodiment 100 has several distinct advantages over prior art ammonia-fueled SOFC systems:

a) parasitic losses related to cooling are minimized by highly efficient use of waste heat in the system. In prior art systems, high volumes of cathode air are required for cooling, resulting in large blower parasitic losses. In the present invention, because ammonia cracking is endothermic, heat is removed directly from the stack in the cracking process. The cracking of excess ammonia 14b to provide an SOFC exhaust 62 very rich in hydrogen consumes even more process heat internally. Further, waste heat in each other part of the system is matched in temperature and available energy by the control of intake air heating to provide stack cooling, cathode air preheating, anode tailgas recycle and fuel preparation, ammonia vaporization, and external heating functions;

b) anode oxidation may be avoided by using a very low rate of consumption of ammonia during SOFC start-up, shutdown, and stand-by operation. This applies to SOFC systems which are fully fueled with ammonia as well as for hybrid SOFC systems wherein ammonia is only a secondary fuel and a conventional hydrocarbon fuel such as natural gas or diesel is reformed as the primary fuel;

c) for safety, embodiment 100 can operate with very little gaseous ammonia or hydrogen present in the system at any time.

A two-stage energy delivery system based on embodiment 100 followed by a secondary energy conversion device 52, for example, vehicle 50, can be very versatile. SOFC 20 can be designed to be primarily an ammonia cracker, generating minimal net electricity but supplying copious amounts of hydrogen for fueling secondary energy conversion system 52, which may be, for example, an ICE, PEM or GT for motive power of a vehicle or for operating a large generator to generate electric power.

Such a two-stage system has numerous operating advantages.

Efficiency:

a) hydrogen addition to the fuel supply for an ICE is known to enhance both partial load and high speed efficiency;

b) nitrogen addition to an ICE fuel supply is known to be an attractive diluent in optimizing efficiency with a NOx constraint; and c) hydrogen may be easily purified with this system, giving known advantages for operation with PEM fuel cells as compared to fueling such fuel cells with conventional reformed hydrocarbon fuels containing CO.

Emission Control:

a) pure, dry ammonia is an ideal reductant for SCR catalysts such as catalyst 54, providing known improvements in low-temperature NOx conversion as compared to prior art urea solution systems;

b) hydrogen is an ideal agent for catalytic combustion (with low light-off temperature) and for dilute gas phase combustion in the presence of other exhaust gases, so it can be used to manage catalyst temperatures, for example, at engine start-up, and for clean regeneration of diesel particulate filters and NOx traps, without increasing hydrocarbon or CO emissions, (i.e. more efficiently than when using conventional hydrocarbon fuels); and c) hydrogen is an ideal agent for ammonia regeneration in NOx traps that have been formulated to produce ammonia from stored NOx during regeneration. This can be used in an SCR catalyst which follows in the exhaust system. This is useful in minimizing ammonia consumption when surplus hydrogen is available from the SOFC system; again, this process is superior to use of conventional fuels.

At a More Global Level:

a) a two-stage system in accordance with the invention provides a safe, highly efficient means for using ammonia as a fuel in power systems with bimodal power operation (standby or idle, and load), such as light duty vehicles, urban transit buses and delivery vehicles, distributed electrical generation systems, district heating systems, combined heat and power systems, and the like; and b) the present system provides a readily scalable power system architecture that enables $CO_2$ sequestration (as at the oil or gas wellhead) such that essentially zero $CO_2$ is emitted by fossil fuels used in the overall scheme of energy generation.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. An energy conversion system, comprising:
   a solid oxide fuel cell stack having an anode and a cathode for producing electricity and a hydrogen-rich anode tailgas stream;
   a source of ammonia for providing ammonia to said anode, said source of ammonia including a storage tank containing an ammonia complexing material; and
   a heat exchanger coupled across an air flow path through said cathode wherein cathode intake air is passed through a first side of said heat exchanger and heated cathode exhaust is passed through a second side of said heat exchanger to temper said intake air;
   wherein said ammonia complexing material may be heated by at least a portion of said cathode exhaust to release gaseous ammonia in a controlled manner.

2. An energy conversion system in accordance with claim 1 wherein the direction of flow of air through said cathode is opposite to the direction of flow of ammonia through said anode.

3. An energy conversion system in accordance with claim 1 wherein said ammonia complexing material includes magnesium chloride.

4. An energy conversion system in accordance with claim 1 wherein said ammonia is cracked to form nitrogen and hydrogen in said anode, and wherein the rate of hydrogen production is greater than the rate required to produce electricity in said solid oxide fuel cell such that unconsumed hydrogen is present in said anode tailgas stream.

5. An energy conversion system in accordance with claim 4 further comprising purification and storage for at least a portion of said hydrogen in said anode tailgas stream.

6. An energy conversion system in accordance with claim 4, where a substantial portion of required stack cooling results from the endotherm of cracking of ammonia to produce hydrogen which is not consumed within the fuel cell system.

7. An energy conversion system in accordance with claim 1 further comprising a secondary energy conversion device fueled at least partially by said anode tailgas stream, defining said system as a two-stage energy conversion system.

8. An energy conversion system in accordance with claim 7 wherein said solid oxide fuel cell stack is a first fuel cell stack and wherein said secondary energy conversion device is selected from the group consisting of internal combustion engine, second fuel cell system, and gas turbine engine.

9. An energy conversion system in accordance with claim 8 wherein said second fuel cell system is selected from the group consisting of solid oxide fuel cell, alkaline fuel cell, and proton exchange membrane fuel cell.

10. An energy conversion system in accordance with claim 7 further comprising aftertreatment devices including one or more of an oxidizing catalyst, a diesel particulate filter and a NOx trap disposed in an exhaust stream from said secondary energy conversion device for oxidizing exhaust constituents and for trapping and later reducing oxides of nitrogen in said exhaust stream.

11. An energy conversion system in accordance with claim 10 wherein hydrogen-rich gas is supplied for warm-up and regeneration of said aftertreatment devices.

12. An energy conversion system in accordance with claim 7 further comprising an SCR catalyst disposed in an exhaust stream from said secondary energy conversion device for reducing oxides of nitrogen in said exhaust stream.

13. An energy conversion system in accordance with claim 12 wherein ammonia is supplied for regeneration of said SCR catalyst.

14. An energy conversion system in accordance with claim 8 further comprising a vehicle supportive of and powered by said two-stage energy conversion system.

15. An energy conversion system in accordance with claim 1 wherein ammonia is used as a reducing gas to protect the SOFC anode from oxidation during start-up, stand-by, and shut-down of said system.

16. An energy conversion system in accordance with claim 15 wherein the primary fuel for the SOFC is one of a conventional hydrocarbon fuel and a synthetic fuel.

* * * * *